United States Patent
Puerta et al.

(10) Patent No.: US 9,004,853 B2
(45) Date of Patent: Apr. 14, 2015

(54) AXIAL COMPRESSOR WITH AN INJECTION DEVICE FOR INJECTING A FLUID

(75) Inventors: Luis Puerta, Rieden (CH); Marco Micheli, Schöfflisdorf (CH); Wolfgang Kappis, Fislisbach (CH); Gabriel Dunkel, Birr (CH)

(73) Assignee: Alstom Technology Ltd, Baden (CH)

( * ) Notice: Subject to any disclaimer, the term of this patent is extended or adjusted under 35 U.S.C. 154(b) by 497 days.

(21) Appl. No.: 13/556,788

(22) Filed: Jul. 24, 2012

(65) Prior Publication Data

US 2013/0058760 A1    Mar. 7, 2013

(30) Foreign Application Priority Data

Jul. 25, 2011    (CH) ........................................ 1237/11

(51) Int. Cl.
| | | |
|---|---|---|
| F04D 19/00 | (2006.01) | |
| F02C 7/143 | (2006.01) | |
| F04D 27/02 | (2006.01) | |
| F02C 3/30 | (2006.01) | |
| F02C 9/18 | (2006.01) | |
| F04D 29/58 | (2006.01) | |
| F04D 29/70 | (2006.01) | |

(52) U.S. Cl.
CPC ......... *F02C 7/1435* (2013.01); *Y10T 29/49826* (2015.01); *F05D 2260/212* (2013.01); *F04D 27/0215* (2013.01); *F02C 3/305* (2013.01); *F02C 9/18* (2013.01); *F04D 29/5846* (2013.01); *F04D 29/705* (2013.01)

(58) Field of Classification Search
CPC ..... F04D 29/5846; F02C 3/305; F02C 7/1435
See application file for complete search history.

(56) References Cited

U.S. PATENT DOCUMENTS

| 2,693,674 | A | * | 11/1954 | Anxionnaz et al. ............. 60/262 |
| 4,711,084 | A | | 12/1987 | Brockett |
| 5,351,478 | A | | 10/1994 | Walker et al. |
| 5,697,209 | A | * | 12/1997 | Wettstein ...................... 60/39.53 |
| 6,126,389 | A | * | 10/2000 | Burdgick ...................... 415/115 |
| 6,224,328 | B1 | | 5/2001 | Weigand et al. |
| 6,644,935 | B2 | | 11/2003 | Ingistov et al. |
| 6,935,119 | B2 | | 8/2005 | Placko et al. |
| 7,033,135 | B2 | | 4/2006 | Mortzheim et al. |
| 8,662,827 | B2 | * | 3/2014 | Schutz ......................... 415/116 |
| 2005/0141991 | A1 | | 6/2005 | Frutschi | |

FOREIGN PATENT DOCUMENTS

EP    0 984 138 A2    3/2000

OTHER PUBLICATIONS

Swiss Search Report (PCT/ISA/201) issued on Nov. 18, 2011, by the Swiss Patent Office for Application No. CH 01237/11.

* cited by examiner

*Primary Examiner* — Dwayne J White
*Assistant Examiner* — Justin Seabe
(74) *Attorney, Agent, or Firm* — Buchanan Ingersoll & Rooney PC

(57) ABSTRACT

An axial compressor is disclosed for compressing air, such as for a gas turbine. The axial compressor can include a rotor, having a multiplicity of rotor blades, and rotor casing. The casing and rotor can form an annular gas passage. Outside the gas passage an annular and concentric bleed air chamber, can include at least one bleed air slot in functional communication with the gas passage. At least one injection device having at least one nozzle which can inject the fluid into the gas passage via the bleed air slot.

18 Claims, 2 Drawing Sheets ical characteristic features and geometric relationships in
AXIAL COMPRESSOR WITH AN INJECTION DEVICE FOR INJECTING A FLUID

RELATED APPLICATION

This application claims priority under 35 U.S.C. §119 to Swiss Patent Application No. 01237/11 filed in Switzerland on Jul. 25, 2011, the entire content of which is hereby incorporated by reference in its entirety.

FIELD

The present disclosure relates to an axial compressor, to a method for producing an axial compressor, and to a gas turbine in combination with such an axial compressor.

BACKGROUND INFORMATION

In axial compressors, such as those used as a component in gas turbines, it is known to inject a fluid, such as water, into a gas passage, in which compression takes place, in order to influence a thermodynamic process being carried out. With such injection, consideration should be given to constructhe axial compressor if extensive and costly modifications and adjustments in the structure of the axial compressor are to be avoided.

A compressor, in which for cooling the rotor shaft cooling air is blown through discharge openings in the blade tips of stator blades against the rotor shaft, is known from printed publication EP 0 984 138. Such a configuration may not be suitable for injecting a fluid into the gas flow, and can involve a special design of the stator blades.

In U.S. Pat. No. 6,644,935, it is proposed to inject a fluid into the gas flow for addressing efficiency in an axial compressor. To this end, radially oriented nozzles are accommodated directly in a bore in a casing of the compressor. Such a direct arrangement, with access from the outside, in a casing wall is possible in the case of compressors of which the casing structure is particularly simple. If, on the other hand, bleed air chambers and corresponding bleed air flanges are provided in the compressor, such a nozzle arrangement cannot be readily realized. Furthermore, sealing issues can occur, and also mechanical and thermal strength can be an issue.

U.S. Pat. No. 7,033,135 proposes to inject a fluid into the gas flow of a turbomachine through openings arranged in a distributed manner in a radial direction on a trailing edge of a stator blade. For connecting the stator blade to a fluid feed, the casing is expensively machined on the inside. Furthermore, the injecting of fluid in the flow direction is not particularly advantageous for mixing of gas and fluid mist.

SUMMARY

An axial compressor is disclosed for compressing air, comprising: a rotor, which is rotatable around a machine axis, having a multiplicity of rotor blades; a casing enclosing the rotor concentrically and at a distance, which casing together with the rotor forms an annular gas passage; at least one essentially annular and concentric bleed air chamber outside the gas passage, wherein the bleed air chamber has at least one bleed air slot, wherein the slot is in functional communication with the gas passage; and at least one injection device for injecting a fluid, the injection device having at least one nozzle for injecting the fluid into the gas passage slot.

A method for producing an axial compressor is also disclosed for compressing air, the method comprising: encasing a rotor, having a multiplicity of rotor blades rotatable around a machine axis, with a casing enclosing the rotor concentrically and at a distance, the rotor and casing forming an annular gas passage, with at least one essentially annular and concentric bleed air chamber outside the gas passage, wherein the bleed air chamber has at least one bleed air slot in functional communication with the gas passage, and with at least one injection device for injecting a fluid, the injection device having at least one nozzle for injecting the fluid into the gas passage slot; splitting the casing along a plane into an upper casing half and a lower casing half; attaching a connecting flange, or flanges on the casing; attaching support elements, for a first means for supplying and distributing fluid to the nozzle, on an inner wall of the bleed air chamber; and fastening the first means, with the nozzles fixedly arranged thereupon, on the support elements.

BRIEF DESCRIPTION OF THE DRAWINGS

Exemplary embodiments will subsequently be explained in more detail in conjunction with the drawing. All elements which are not required for the direct understanding of the embodiment have been omitted. In the drawing.

DETAILED DESCRIPTION

Figure 1:
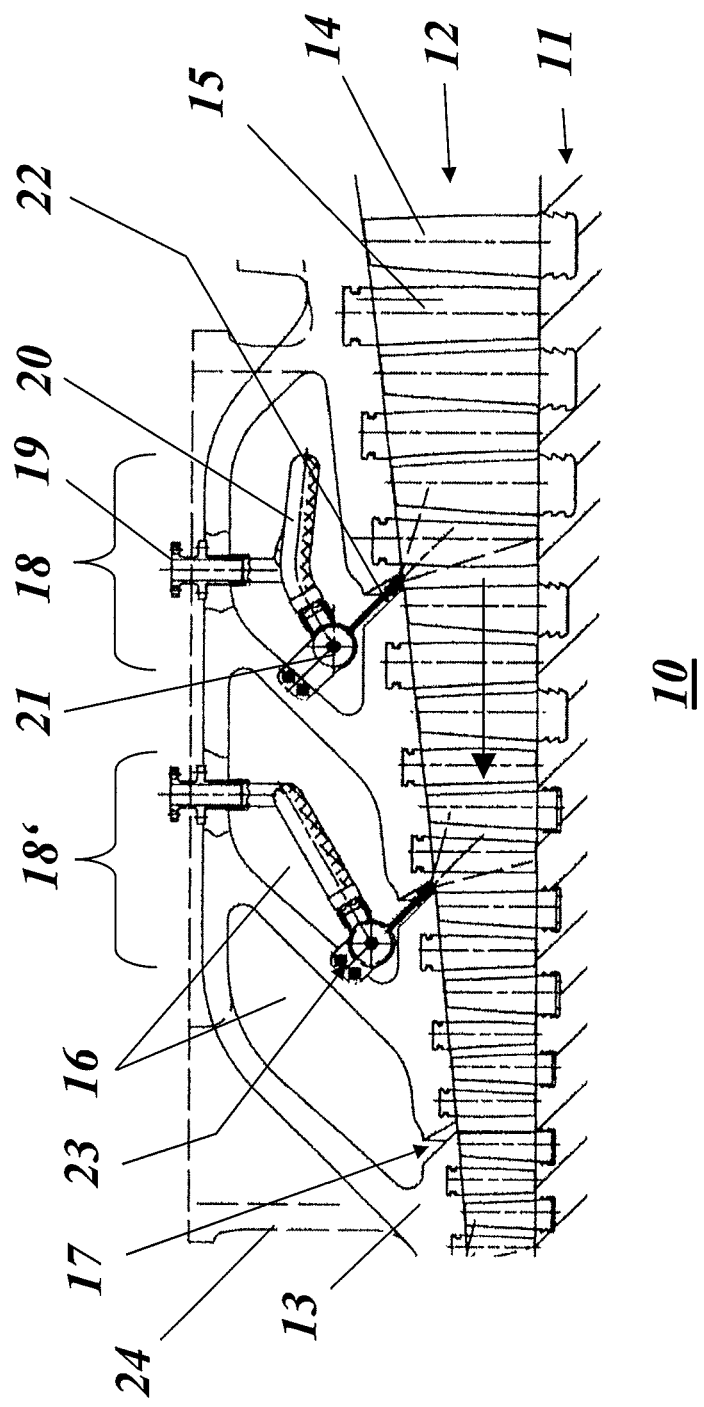
FIG. 1 shows in a detail an axial compressor having injection devices for injecting a fluid into the gas passage according to an exemplary embodiment.

An axial compressor is disclosed which can avoid disadvantages of known solutions and in a simple and easily realizable manner enable effective injection of fluid into a gas flow.

An axial compressor is disclosed for compressing air, such as for a gas turbine, which axial compressor can include a rotor. The rotor can be rotatable around a machine axis, having a multiplicity of rotor blades. A casing can enclose the rotor concentrically and at a distance, which casing together with the rotor forms an annular gas passage. Outside the gas passage there are, for example, annular and concentric bleed air chambers which are in communication with the gas passage by annular and concentric bleed air slots in each case.

The axial compressor can be equipped with at least one injection device for injecting a fluid, such as water. The at least one injection device can include a multiplicity of nozzles which, distributed over the circumference, inject the fluid into the gas passage via a bleed air slot. The at least one injection device can include first means for feeding and distributing fluid or water to the individual nozzles which are arranged in the bleed air chamber which is associated with the bleed air slot. The first means can be supplied from the outside with the fluid via a connecting flange which is attached on the casing.

An exemplary development of the axial compressor disclosed herein is that the nozzles are arranged in the bleed air slot. By using the existing bleed air slot as an opening for accommodating the nozzles, the machining of the casing for the injection can be drastically reduced in extent. At the same time, access to the nozzles from the bleed air chambers which are arranged behind the bleed air slots can be given in a simple manner.

The bleed air slots are, for example, arranged at an angle to the flow direction so that the gas flow can be tapped off in a better way. This can, for example, be advantageously utilized for a development of embodiments wherein the nozzles are oriented by their nozzle axis towards the machine axis and in the flow direction are arranged in a tilted manner from the radial direction in such a way that the fluid is injected against the flow in the gas passage.

In exemplary embodiments, the first means can include a pipe bend which extends through the bleed air chamber transversely to the flow direction, and on which the nozzles are fastened. By combining pipe bends and nozzles to form a module, a constructional simplification of the arrangement can be achieved and at the same time the mechanical stability of the arrangement ensured.

A further simplification can result from the fact that according to another feature disclosed herein, the pipe bend is fastened on an inner wall of the bleed air chamber, and the pipe bend is connected to the connecting flange via a flexible connecting hose. As a result, a decoupling between the nozzles or the pipe bend and the outer side of the casing can be achieved, allowing thermal expansions and improved sealing.

If the casing is split along a plane (e.g., in a horizontal parting plane) into an upper casing half and a lower casing half, the injection device can be advantageously split corresponding to the casing into an upper injection device and a lower injection device, wherein a separate connecting flange can, for example, be associated in each case with the upper injection device and the lower injection device. As a result of this, assembly and disassembly of the machine can be greatly simplified.

This is, for example, applicable when the first means includes in each case a semi-circular pipe bend for the upper injection device and for the lower injection device, which extends through the bleed air chamber transversely to the flow direction, and on which the nozzles are fastened.

According to another exemplary embodiment—if corresponding bleed air chambers and bleed air slots are available—a plurality of injection devices of the same type can be arranged in series in the axial direction. The injection process can thus be adapted to the thermodynamic specifications in an even better and more flexible manner.

An exemplary method is also disclosed for producing an axial compressor which has a casing which is split in, for example, a horizontal parting plane into an upper casing half and a lower casing half. A connecting flange, or flanges, can be attached on the casing in a first step, by support elements for the first means being attached on an inner wall of the bleed air chamber in another step, and by the first means, with the nozzles fixedly arranged thereupon, being fastened on the support elements in a further step.

An exemplary gas turbine as disclosed herein can be equipped with an axial compressor s disclosed herein.

An axial compressor, such as for a gas turbine, is also disclosed having a device for introducing or injecting a fluid into the gas passage, and also a method is disclosed for its production.

The injection device can include a nozzle arrangement for injecting the fluid, corresponding pipe bends for distribution of the fluid to the nozzles, and also devices for fastening the device on the gas passage. Furthermore, provision can be made for flexible connecting hoses and connecting flanges on the casing of the axial compressor, via which the fluid can be supplied from the outside. The nozzles can be arranged in the bleed air slots which are provided in the axial compressor and spray the fluid in a conical spray mist in a direction opposite to the main gas flow. The spray angle of the injected fluid jet can bring about a finely distributed mist over an entire height of the flow passage.

Reproduced in FIG. 1, in a detail, is an exemplary axial compressor with injection devices for injecting a fluid into the gas passage according to an exemplary embodiment. The axial compressor 10 has a central rotor 11 which carries a multiplicity of rotor blades 14 which are radially oriented and project into an annular gas passage 12 which tapers in cross section. The rotor blades 14 alternate in the gas passage 12 with stator blades 15 which are attached on the inner side of a casing 13 which concentrically encloses the rotor 11. The positioning of the rotor blades 14 can be selected so that during corresponding rotation of the rotor 11 the gas in the gas passage 12, coming from the right in the direction of the drawn-in arrow, flows to the left and is compressed in the process.

A plurality of encompassing bleed air chambers 16, adjoining the gas passage 12 on the outside, are formed in the casing 13 of the axial compressor 10 and are in communication with the gas passage 12 via encompassing bleed air slots 17 which are inclined in the flow direction. Via the bleed air slots 17, compressed air flows into the adjoining bleed air chambers 16 during operation and from there, via bleed air flanges 24 (and 25 in FIG. 3) which are arranged on the outside on the axial compressor 10, can be discharged for further utilization.

According to an exemplary embodiment, the bleed air chambers 16 constitute suitable spaces in order to accommodate, at little cost, the injection devices 18 or 18' which are used for injecting a fluid. At the same time, the associated bleed air slots 17, from their design and inclination, can be well suited to accommodating the associated nozzles 22. As a result of optimum utilization of spaces already existing in the casing 13, the cost incurred in the machining of the casing 13 for the injection devices 18a, b, can be kept exceptionally low.

Figure 2:
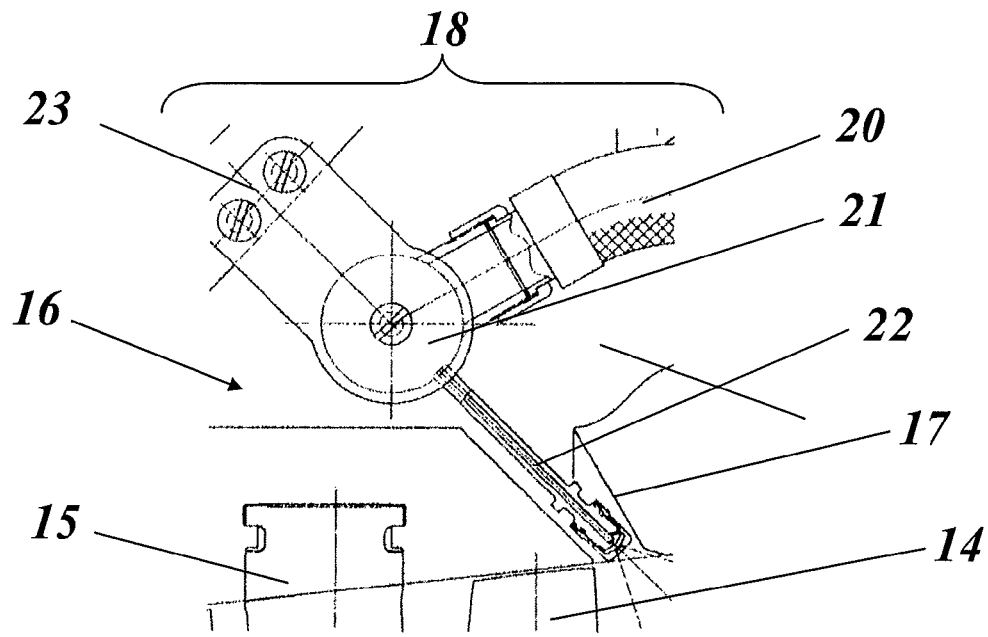
FIG. 2 shows in an enlarged detail from FIG. 1 exemplary characteristic features of an injection device.
Figure 3:
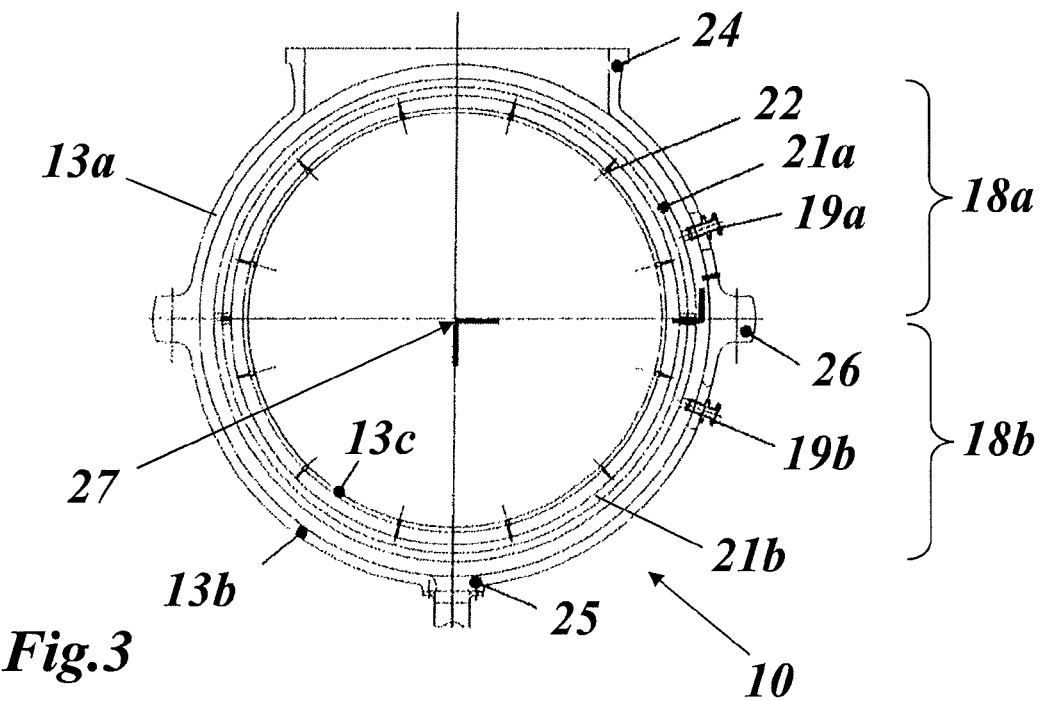
FIG. 3 as seen in the axial direction, shows an exemplary arrangement of injection devices in an axial compressor with a split casing.

According to FIGS. 1-3, for forming the injection devices 18, 18' pipe bends 21 or 21a, b, can be fastened in each case on an inner wall of the bleed air chambers 16 by means of suitable support elements 23, from which pipe bends the nozzles 22, distributed over the circumference, project into the associated bleed air slots 17 to such an extent that the tips of the nozzles 22 end on the outer edge of the gas passage 12 or on the casing inner wall (13c in FIG. 3) (see FIG. 2). The pipe bends 21 or 21a, b can be connected via flexible connecting hoses 20 to corresponding connecting flanges 19 or 19a, b which project from outside through the outer casing wall into the bleed air chambers 16.

As it is apparent from FIG. 3, the injection devices 18, 18'—if the casing 13 of the axial compressor 10 is splittable into an upper casing half 13a and a lower casing half 13b in a parting plane, passing through the machine axis 27, on a casing flange 26—can also be split into an upper injection device 18a and a lower injection device 18b with semi-circular upper and lower pipe bends 21a and 21b in each case, and also associated upper and lower connecting flanges 19a and 19b.

In an exemplary method for producing such an axial compressor with injection devices, the outer compressor casing can be mechanically machined in order to attach the connecting flanges 19 or 19a, b. Furthermore, the casing can be machined in the parting plane in order to attach the support elements 23 for the pipe bends 21 or 21a, b. The semi-circular pipe bends 21a, b can be installed with the nozzles 22 arranged thereupon.

The injection devices therefore can include two semi-circular pipe bends in a concentric bleed air chamber with a multiplicity of nozzles which are arranged along the pipe axis. The nozzles can be directed into the associated bleed air slot which is, for example, positioned directly after a stator blade row and in front of a rotor blade row in the flow direction (see the injection devices 18, 18' in FIG. 1). Each of the pipe bends can be connected by means of a flexible connecting hose (or other suitable connection) to a corresponding connecting flange passing through the casing, through which pipe bend the fluid is introduced. The nozzles can create a fine spray mist in the shape of, for example, a cone which is oriented against the flow direction and covers, for example, entire height of the gas passage (see FIG. 1).

Exemplary embodiments as described herein can achieve the following advantages:

- The casing of the axial compressor has to be only slightly altered for the injection devices;
- No two casing walls with adjoining seal have to be drilled through for the nozzles;
- The semi-circular pipe shapes are compatible with the design of the outer casing;
- The regions between the stator blades and rotor blades do not have to be modified;
- If stator blades are exchanged, the injection devices do not have to be removed;
- The external pipe connections do not have to be disassembled if the upper casing half is removed;
- The number of nozzles can be varied (e.g. when extending an injection device) without the stator blades having to be altered; and
- The position of the nozzles can be adapted so that they inject the fluid between the stator blades, such as if the number of stator blades is altered when modifying the compressor.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

10 Axial compressor
11 Rotor
12 Gas passage
13 Casing
13a, b Casing half
13c Casing inner wall
14 Rotor blade
15 Stator blade
16 Bleed air chamber
17 Bleed air slot
18, 18', 18a, b Injection device
19, 19a, b Connecting flange
20 Connecting hose
21, 21a, b Pipe bend
22 Nozzle
23 Support element
24, 25 Bleed air flange
26 Casing flange
27 Machine axis

The invention claimed is:

1. An axial compressor for compressing air, comprising:
a rotor, which is rotatable around a machine axis, having a multiplicity of rotor blades;
a casing enclosing the rotor concentrically and at a distance, which casing together with the rotor forms an annular gas passage;
at least one essentially annular and concentric bleed air chamber outside the gas passage, wherein the bleed air chamber has at least one bleed air slot, wherein the slot is in functional communication with the gas passage; and
at least one injection device for injecting a fluid, the injection device having at least one nozzle for injecting the fluid into the gas passage wherein the at least one nozzle is arranged in the bleed air slot.

2. The axial compressor as claimed in claim 1, wherein the bleed air slot is of an annular and concentric design, and the injection device has a number of nozzles which are distributed over a circumference of the bleed air slot for supplying and distributing the fluid into the gas passage.

3. The axial compressor as claimed in claim 1, wherein at least one injection device comprises:
first means for supplying and distributing the fluid to the nozzle which is arranged in the bleed air chamber associated with the bleed air slot, and wherein the first means has a connecting flange attached on the casing, for supplying the injection device with the fluid from outside of the casing.

4. The axial compressor as claimed in claim 2, wherein the nozzles are oriented with their nozzle axis towards the machine axis and are arranged in a flow direction in a tilted manner from a radial direction such that the fluid will be injected against a flow in the gas passage during operation.

5. The axial compressor as claimed in claim 3, wherein the first means comprise:
a pipe bend which extends through the bleed air chamber transversely to the flow direction, and on which the nozzles are fastened.

6. The axial compressor as claimed in claim 5, wherein the pipe bend is fastened on an inner wall of the bleed air chamber, and wherein the pipe bend is connected to the connecting flange via a flexible connecting hose.

7. The axial compressor as claimed in claim 3, wherein the casing is split in a horizontal parting plane into an upper casing half and a lower casing half, and the injection device is split, in correspondence with the casing, into an upper injection device and a lower injection device, and wherein a separate connecting flange is associated, in each case with the upper injection device and the lower injection device.

8. The axial compressor as claimed in claim 7, wherein the first means comprise:
a semi-circular pipe bend for each of the upper injection device and for the lower injection device, which extends through the bleed air chamber transversely to the flow direction, and on which the nozzles are fastened.

9. The axial compressor as claimed in claim 1, comprising:
a plurality of injection devices of a same type arranged in series in an axial direction.

10. The axial compressor as claimed in claim 1, in combination with a gas turbine.

11. The axial compressor as claimed in claim 2, wherein at least one injection device comprises:
first means for supplying and distributing the fluid to the nozzle which is arranged in the bleed air chamber associated with the bleed air slot, and wherein the first means has a connecting flange attached on the casing, for supplying the injection device with the fluid from outside of the casing.

12. The axial compressor as claimed in claim 11, wherein the nozzles are oriented with their nozzle axis towards the machine axis and are arranged in a flow direction in a tilted manner from a radial direction such that the fluid will be injected against a flow in the gas passage during operation.

13. The axial compressor as claimed in claim 12, wherein the first means comprise:
   a pipe bend which extends through the bleed air chamber transversely to the flow direction, and on which the nozzles are fastened.

14. The axial compressor as claimed in claim 13, wherein the pipe bend is fastened on an inner wall of the bleed air chamber, and wherein the pipe bend is connected to the connecting flange via a flexible connecting hose.

15. The axial compressor as claimed in claim 13, wherein the casing is split in a horizontal parting plane into an upper casing half and a lower casing half, and the injection device is split, in correspondence with the casing, into an upper injection device and a lower injection device, and wherein a separate connecting flange is associated, in each case with the upper injection device and the lower injection device.

16. The axial compressor as claimed in claim 15, wherein the first means comprise:
   a semi-circular pipe bend for each of the upper injection device and for the lower injection device, which extends through the bleed air chamber transversely to the flow direction, and on which the nozzles are fastened.

17. The axial compressor as claimed in claim 16, comprising:
   a plurality of injection devices of a same type arranged in series in an axial direction.

18. A method for producing an axial compressor for compressing air, the method comprising:
   encasing a rotor, having a multiplicity of rotor blades rotatable around a machine axis, with a casing enclosing the rotor concentrically and at a distance, the rotor and casing forming an annular gas passage, with at least one essentially annular and concentric bleed air chamber outside the gas passage, wherein the bleed air chamber has at least one bleed air slot in functional communication with the gas passage, and with at least one injection device for injecting a fluid, the injection device having at least one nozzle for injecting the fluid into the gas passage wherein the at least one nozzle is arranged in the bleed air slot;
   splitting the casing along a plane into an upper casing half and a lower casing half;
   attaching a connecting flange, or flanges on the casing;
   attaching support elements, for a first means for supplying and distributing fluid to the nozzle, on an inner wall of the bleed air chamber; and
   fastening the first means, with the nozzles fixedly arranged thereupon, on the support elements.

* * * * *